United States Patent
You et al.

(10) Patent No.: US 7,205,808 B2
(45) Date of Patent: Apr. 17, 2007

(54) POWER SUPPLY SWITCHING CIRCUIT AND METHOD

(75) Inventors: Yong-Xing You, Shenzhen (CN); Xing-Jun Yang, Shenzhen (CN); Jin-Liang Xiong, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 18 days.

(21) Appl. No.: 11/143,852

(22) Filed: Jun. 2, 2005

(65) Prior Publication Data
US 2005/0285190 A1    Dec. 29, 2005

(30) Foreign Application Priority Data
Jun. 28, 2004   (CN) .................... 2004 1 0027933

(51) Int. Cl.
*H03K 5/1536* (2006.01)
*H03K 17/13* (2006.01)

(52) U.S. Cl. .................... 327/198; 327/78; 327/482

(58) Field of Classification Search .................. None
See application file for complete search history.

(56) References Cited

U.S. PATENT DOCUMENTS

| 4,254,347 A | * | 3/1981 | Ray ........................... 327/143 |
| 4,754,166 A | * | 6/1988 | Nagano ....................... 327/143 |
| 5,517,153 A | | 5/1996 | Yin et al. .................... 327/546 |
| 2006/0145731 A1 | * | 7/2006 | Jiang et al. ................. 327/100 |

* cited by examiner

*Primary Examiner*—My-Trang Nu Ton
*Assistant Examiner*—Terry L. Englund
(74) *Attorney, Agent, or Firm*—Morris Manning & Martin LLP; Tin Tingkang Xia, Esq.

(57) ABSTRACT

A power supply switching circuit includes an input terminal (2) for receiving a signal from a motherboard, an output terminal (4) to output a control signal, a first Bipolar Junction Transistor (BJT) (5), and a second BJT (7). A base of the first BJT is connected to the input terminal via a base bleeder circuit. A collector of the first BJT is connected to a stand-by power supply terminal (10) via a collector resistor. A base of the second BJT is connected to the collector of the first BJT. A collector of the second BJT is connected to a system power supply terminal (12) via a collector resistor. The collector of the second BJT is connected to the output terminal. Emitters of the first and second BJTs are grounded.

15 Claims, 5 Drawing Sheets

POWER SUPPLY SWITCHING CIRCUIT AND METHOD

BACKGROUND OF THE INVENTION

1. Field of the Invention

The present invention relates to a power supply switching circuit, and more particularly to a power supply switching circuit for a Universal Serial Bus (USB) circuit.

2. General Background

A USB circuit of a contemporary motherboard generally has a system operating voltage of 12 volts, and a stand-by voltage of 5 volts. With the changes of the working status of the motherboard, the USB circuit is switched between the two voltages. A switching circuit receives a "Power Good (PG)" signal from the motherboard which indicates the working status of the motherboard, and then outputs a Power_OK (PWR_OK) signal.

Currently, chips including Intel's 810, 815, 845, 850, 875, 915, 925, etc. series all adopt Metal-Oxide Semiconductor Field Effect Transistors (MOSFETs) as controlling switches in the USB circuits.

Referring to FIG. 4, a conventional power supply switching circuit generally includes two MOSFETs 1, 3. A gate of the MOSFET 1 is connected to an input terminal 2 to receive a PG signal. A drain of the MOSFET 1 is connected to a gate of the MOSFET 3, and is also connected a stand-by power supply terminal 10 via a drain resistor 6. The stand-by power supply terminal 10 supplies a voltage of 5 volts. A source of the MOSFET 1 is grounded. A drain of the MOSFET 3 is connected to a system power supply terminal 12 via a drain resistor 8. The system power supply terminal 12 supplies a voltage of 12 volts. A source of the MOSFET 3 is grounded. The drain of the MOSFET 3 also acts as a signal output terminal 4 to output a PWR_OK signal. A threshold voltage of the MOSFET 1 or 3 is 2.2 volts. When the input terminal 2 receives a logic high PG signal which is higher than 2.2 volts, the MOSFET 1 is turned on (i.e., is at a working status). At this time, the drain voltage of the MOSFET 1 drops from the 5 volt stand-by voltage to a lower level. When the drain voltage of the MOSFET 1 drops to a lower level which is less than 2.2 volts, the MOSFET 3 is turned off (i.e., is at a non-working status). The drain voltage of the MOSFET 3 is raised to 12 volts. Thus, the output terminal 4 outputs a 12 volt PWR_OK signal. The 12 volt PWR_OK signal switches the USB circuit to an operating voltage. Conversely, when the input terminal 2 receives a logic low PG signal which is lower than 2.2 volts, the MOSFET 1 is turned off. The drain voltage of the MOSFET 1 is raised to 5 volts, the MOSFET 3 is thereby turned on. The output terminal 4 outputs a zero volt PWR_OK signal, which switches the USB circuit to a stand-by voltage.

Referring also to FIG. 5, a signal line 9' indicates a voltage signal at a node 9 of the switching circuit. The node 9 corresponds to the drain of the MOSFET 1. A signal line 4' indicates the PWR_OK signal of the output terminal 4. When the voltage at the node 9 drops from 5 volts to 2.2 volts, the voltage at the output terminal 4 is turned over from zero volts to 12 volts. A turnover voltage of the switching circuit is 2.2 volts, which is close to a 2.4 volt certain logic high voltage. If other factors, such as ambient temperature fluctuations and unstable voltages, interfere with the MOSFETs 1, 3, the MOSFETs 1, 3 may not be turned over, even if the input PG signal reaches the logic high voltage. This can lower the performance of the switching circuit.

In addition, even though the switching circuit performs the USB circuit power supply switching, the MOSFETs 1, 3 are generally quite expensive, which increases the cost of the USB circuit. Furthermore, the threshold voltage of the MOSFETs is close to a lower limit (2.4 volts) of the logic high voltage of the PG signal. This can lead to instability of the switching circuit.

What is needed is a power supply switching circuit for a USB circuit which is relatively inexpensive and which has optimized performance.

SUMMARY

A power supply switching circuit in accordance with a preferred embodiment includes an input terminal for receiving a signal from a motherboard, an output terminal to output a control signal, a first Bipolar Junction Transistor (BJT), and a second BJT. A base of the first BJT is connected to the input terminal via a base bleeder circuit. A collector of the first BJT is connected to a stand-by power supply terminal via a collector resistor. A base of the second BJT is connected to the collector of the first BJT. A collector of the second BJT is connected to a system power supply terminal via a collector resistor. The collector of the second BJT is connected to the output terminal. Emitters of the first and second BJTs are grounded.

The base bleeder circuit includes a first base resistor connected between the input terminal and the base of the first BJT, and a second base resistor connected between the base of the first BJT and a ground. The base bleeder circuit is adopted to adjust a suitable turnover voltage.

Other objects, advantages and novel features will become more apparent from the following detailed description when taken in conjunction with the accompanying drawings, in which:

DETAILED DESCRIPTION OF THE EMBODIMENT

Figure 1:
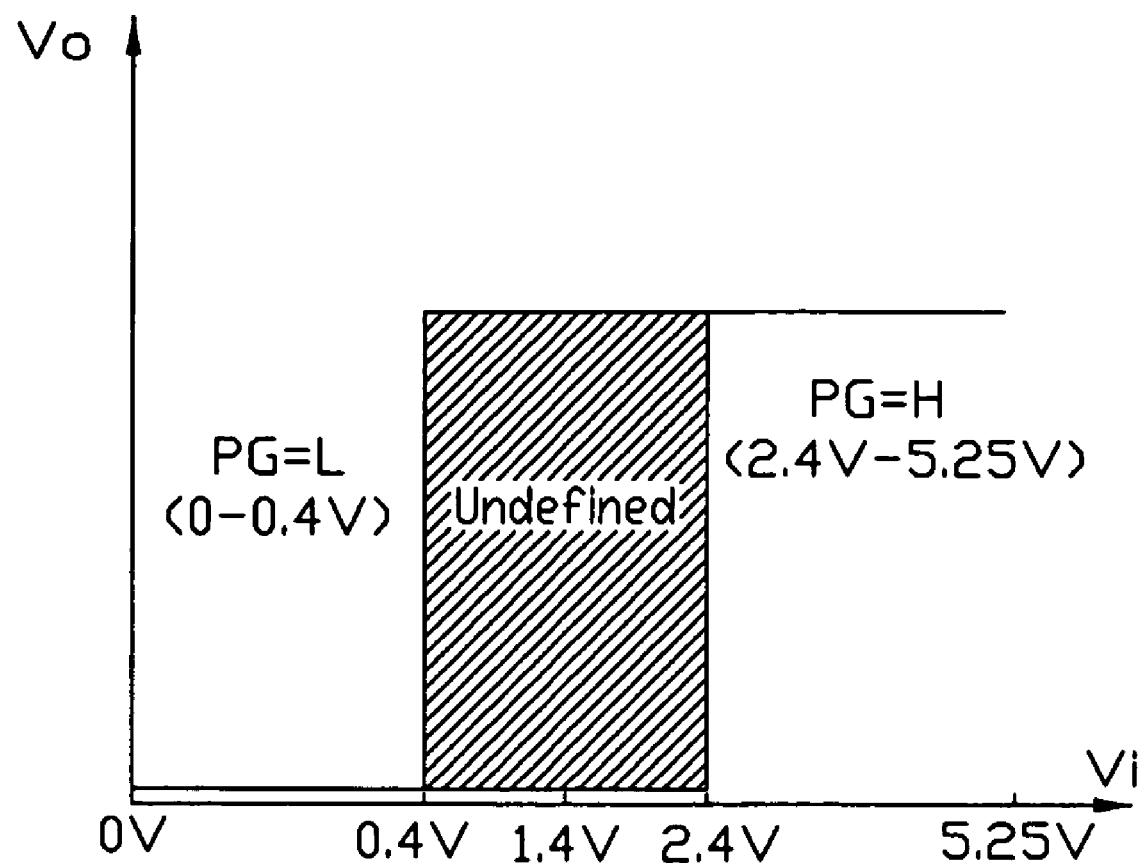
FIG. 1 is a graph showing a certain logic low range, a certain logic high range, and an undefined range of a PG signal in accordance with a preferred embodiment of the present invention.

A power supply switching circuit for a USB circuit of a motherboard in accordance with a preferred embodiment of the present invention is described herein. Referring to FIG. 1, the motherboard sends a PG signal Vi indicating a status of the motherboard to the power supply switching circuit. A PG signal voltage output Vo is certainly logic low when Vi is between zero and 0.4 volts, is certainly logic high when Vi is between 2.4 and 5.25 volts, and is undefined when Vi is between 0.4 and 2.4 volts because of some external factors, such as ambient temperature fluctuations and unstable voltages. The PG signal Vi is used as a switching signal. Accordingly, if a turnover voltage of the switching circuit is near 0.4 volts or 2.4 volts, the switching circuit is relatively unstable. Therefore optimality analysis provides an optimal value of the turnover voltage as follows: (0.4+2.4)/2=1.4.

Figure 2:
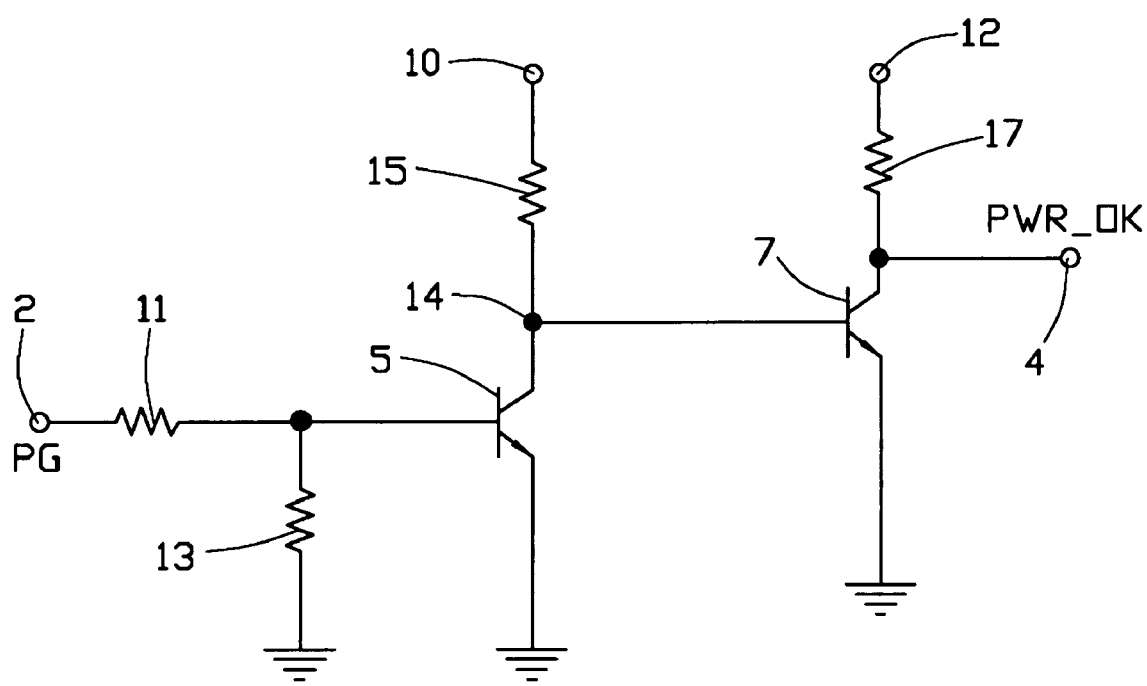
FIG. 2 is a circuit diagram of a power supply switching circuit in accordance with a preferred embodiment of the present invention.

Referring to FIG. 2, the power supply switching circuit includes a first bipolar junction transistor (BJT) 5, a second BJT 7, a first base resistor 11, a second base resistor 13, a first collector resistor 15, and a second collector resistor 17.

The first BJT 5 has a base, an emitter, and a collector. The base of the first BJT 5 is connected to a signal input terminal 2 via the first base resistor 11 to receive the PG signal. The base is grounded via the second base resistor 13. The collector of the first BJT 5 is connected to a stand-by power supply terminal 10. The emitter of the first BJT 5 is grounded.

The second BJT 7 has a base, an emitter, and a collector. The base of the second BJT 7 is connected to the collector of the first BJT 5. The collector of the second BJT 7 is connected to a system power supply terminal 12, and also acts as an output terminal to output a PWR_OK signal. The emitter of the second BJT 7 is grounded.

Because a threshold voltage of a BJT is generally at a low level (less than 1.4 volts), a base bleeder circuit that includes the resistors 11, 13 is applied to the base of the first BJT 5, so that the turnover voltage is capable of being 1.4 volts. The turnover voltage of the first BJT 5 is configured to the optimal value, viz., 1.4 volts, by adjusting the resistances of the first base resistor 11 and the second base resistor 13 accordingly. To obtain the optimal value, the resistance of the first base resistor 11 is adjusted to 10 kilohm, and the resistance of the second base resistor 13 is adjusted to 11.5 kilohm.

When the input terminal 2 receives a logic high PG signal which is higher than 1.4 volts, the first BJT 5 is at a working status. The collector voltage of the first BJT 5 drops from a 5 volt stand-by voltage. When the collector voltage of the first BJT 5 drops to a level which is lower than the threshold voltage of the second BJT 7, the second BJT 7 is at a non-working status, and the collector voltage of the second BJT 7 is raised to 12 volts. The output terminal 4 therefore outputs a 12 volt PWR_OK signal. The PWR_OK signal makes the USB circuit switch to a system working voltage.

When the input terminal 2 receives a logic low PG signal which is lower than 1.4 volts, the first BJT 5 is at an off-working status. The collector voltage of the first BJT 5 is raised to the 5 volt stand-by voltage. Thereby the second BJT 7 is at a working status, and the collector voltage of the second BJT 7 drops to zero volts. The output terminal 4 therefore outputs a zero volt PWR_OK signal. The PWR_OK signal makes the USB circuit switch to a stand-by voltage.

Figure 3:
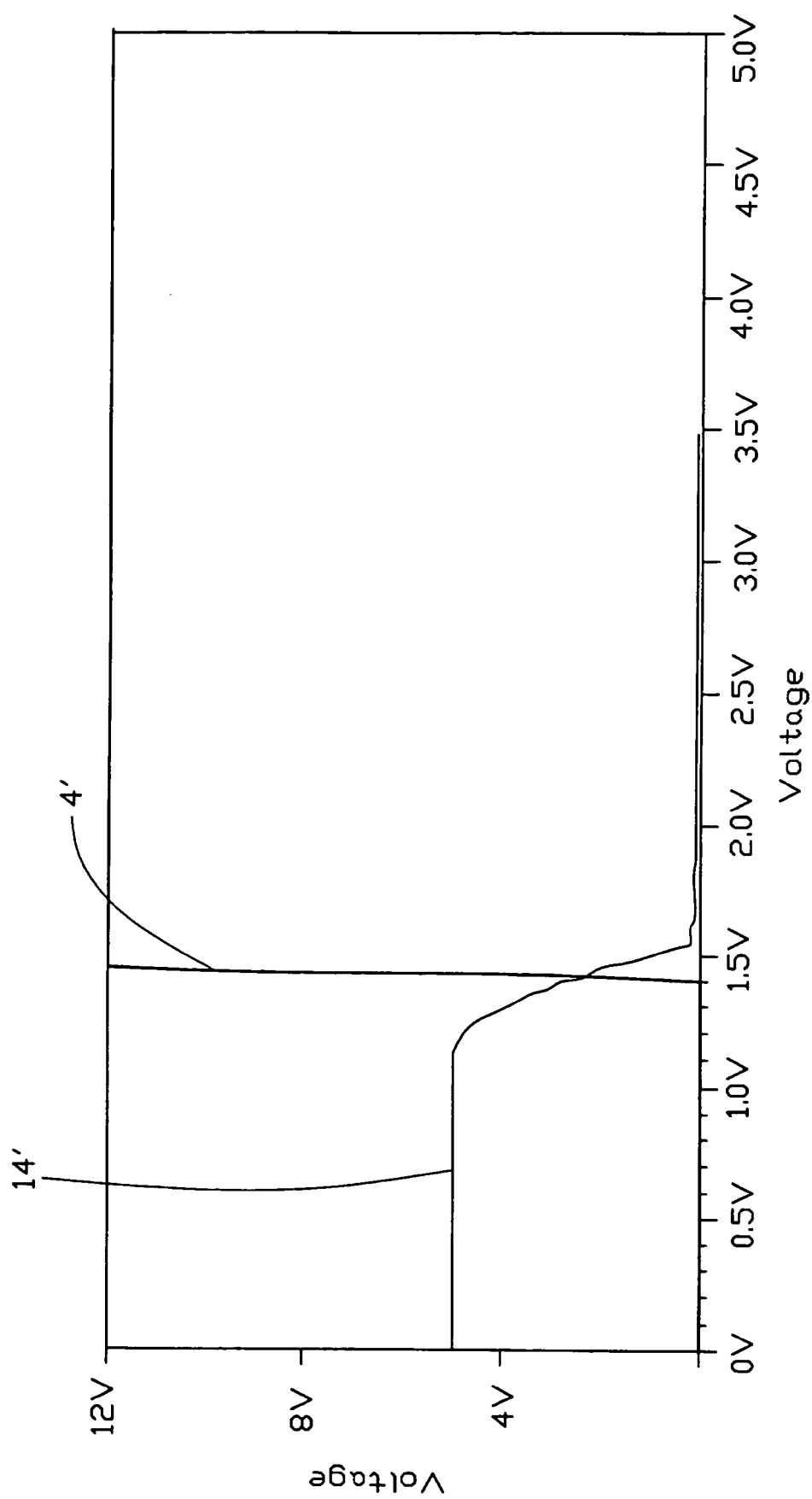
FIG. 3 is a signal verified graph of the switching circuit of FIG. 2.
Figure 4:
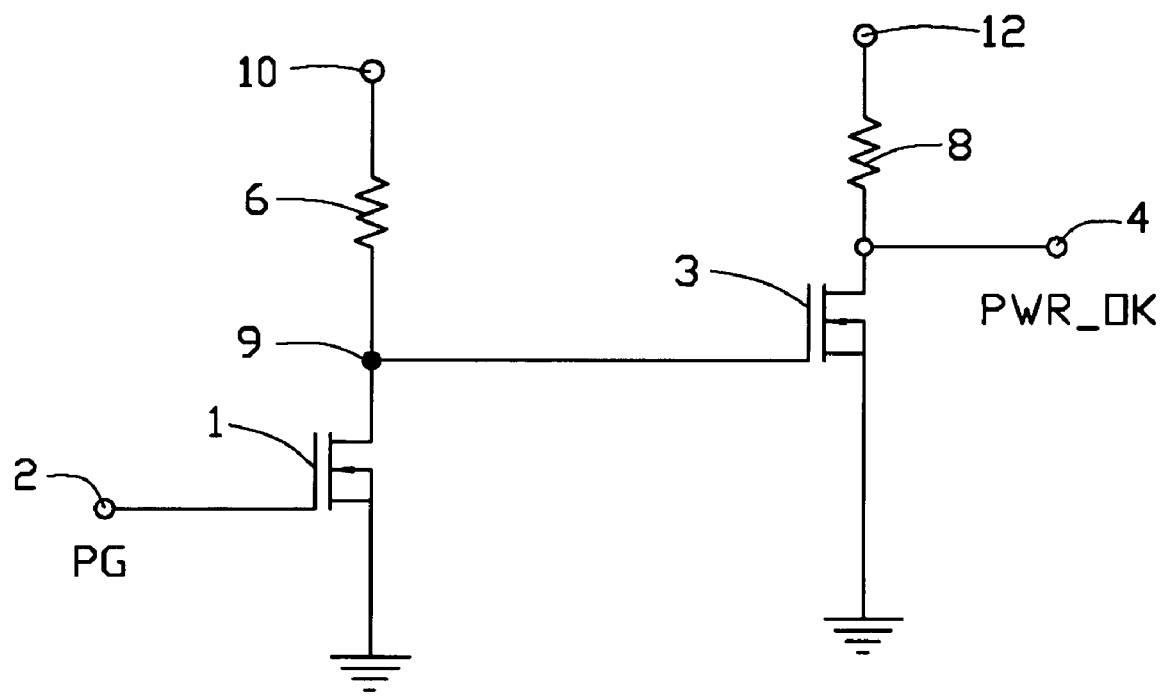
FIG. 4 is a circuit diagram of a conventional power supply switching circuit.
Figure 5:
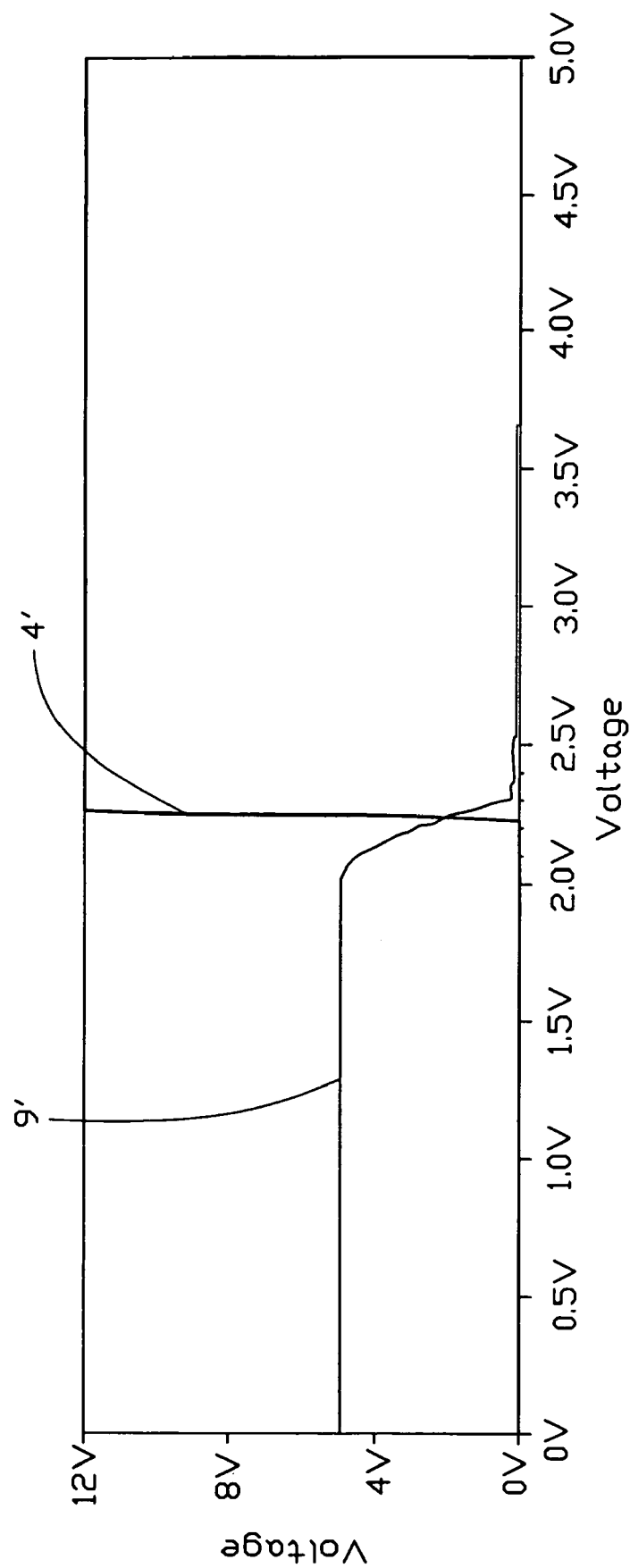
FIG. 5 is a signal verified graph of the switching circuit of FIG. 4.

Referring also to FIG. 3, a signal line 14' indicates a voltage signal of a node 14 that is the collector of the first BJT 5. A signal line 4' indicates the PWR_OK signal of the output terminal 4. When the voltage at the node 14 drops from 5 volts to 1.4 volts, the voltage at the output terminal 4 is turned over from zero volts to 12 volts. The turnover voltage is right at the optimal value of 1.4 volts, which indicates that the circuit performance in accordance with the preferred embodiment is optimized. In addition, the switching circuit of the preferred embodiment of the present invention utilizes relatively inexpensive BJTs instead of expensive MOSFETs. This lowers the cost of the whole switching circuit.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

We claim:

1. A power supply switching circuit, comprising:
    an input terminal for receiving a signal from a motherboard;
    an output terminal to output a control signal;
    a stand-by power supply terminal and a system power supply terminal;
    a first Bipolar Junction Transistor (BJT), a base of the first BJT being connected to the input terminal via a base bleeder circuit, a collector of the first BJT being connected to the stand-by power supply terminal via a collector resistor, and an emitter of the first BJT being grounded; and
    a second BJT, a base of the second BJT being connected to the collector of the first BJT, a collector of the second BJT being connected to the system power supply terminal via another collector resistor, the collector of the second BJT being connected to the output terminal, and an emitter of the second BJT being grounded; wherein the signal from the motherboard indicates a status of the motherboard, the signal has a particular logic low range and a particular logic high range, and an average of a highest value of the logic low range and a lowest value of the logic high range is adopted as a turnover voltage of the power supply switching circuit.

2. The power supply switching circuit as claimed in claim 1, wherein the base bleeder circuit comprises a first base resistor connected between the input terminal and the base of the first BJT.

3. The power supply switching circuit as claimed in claim 2, wherein the base bleeder circuit further comprises a second base resistor connected between the base of the first BJT and ground.

4. The power supply switching circuit as claimed in claim 1, wherein the turnover voltage is adjusted to the average value via the base bleeder circuit.

5. The power supply switching circuit as claimed in claim 1, wherein the stand-by power supply terminal is connected to a 5 volt stand-by power supply, and the system power supply terminal is connected to a 12 volt system power supply.

6. A method for power supply switching of a Universal Serial Bus (USB) circuit of a motherboard, comprising the steps of:
    providing a stand-by power supply terminal and a system power supply terminal;
    providing a first Bipolar Junction Transistor (BJT), a base of the first BJT being connected to an input terminal via a base bleeder circuit, a collector of the first BJT being connected to the stand-by power supply terminal via a collector resistor, and an emitter of the first BJT being grounded;
    providing a second BJT, a base of the second BJT being connected to the collector of the first BJT, a collector of the second BJT being connected to the system power supply terminal via another collector resistor, the collector of the second BJT being connected to an output terminal, and an emitter of the second BJT being grounded;
    wherein the input terminal is adapted for receiving a signal indicating a status of the motherboard; and
    adjusting a turnover voltage of the first BJT via the base bleeder circuit, wherein the signal has a particular logic low range and a particular logic high range, and an average of a highest value of the logic low range and a lowest value of the logic high range is adopted as the turnover voltage.

7. The method as claimed in claim 6, wherein the stand-by power supply terminal is connected to a 5 volt stand-by power supply, and the system power supply terminal is connected to a 12 volt system power supply.

8. The method as claimed in claim 6, wherein the base bleeder circuit comprises a first base resistor connected between the input terminal and the base of the first BJT.

9. The method as claimed in claim 8, wherein the base bleeder circuit further comprises a second base resistor connected between the base of the first BJT and ground.

10. A method for controlling power supply statuses of a Universal Serial Bus (USB) circuit, comprising the steps of:
providing a lower power supply for a stand-by status of said power supply statuses of said USB circuit;
providing a higher power supply for a system-active status of said power supply statuses of said USB circuit;
electrically connecting a first switch to said lower power supply, and a second switch to said higher power supply;
electrically connecting said first switch to said second switch so as to control said second switch; and
transmitting a control input signal to said first switch by means of adjustment of a bleeder circuit electrically connected with said first switch so as to control said first and second switches for performing a selective one of said stand-by status and said system-active status of said USB circuit based on said control input signal adjusted by said bleeder circuit;
wherein the control input signal has a particular logic low range and a particular logic high range, and an average of a highest value of the logic low range and a lowest value of the logic high range is adopted as the adjusted control input signal.

11. The method as claimed in claim 10, wherein said adjustment of said bleeder circuit is to adjust voltage of said control input signal to be transmitted to said first switch.

12. The method as claimed in claim 10, wherein said bleeder circuit comprises at least two resistors electrically connected with said first switch.

13. The method as claimed in claim 10, wherein said first and second switches are Bipolar Junction Transistors (BJTs).

14. The method as claimed in claim 13, wherein said first switch of the BJTs has a base thereof used to acquire said control input signal via said bleeder circuit, a collector thereof electrically connected to said lower power supply and said second switch, and an emitter thereof electrically grounded.

15. The method as claimed in claim 13, wherein said second switch of the BJTs has a base thereof electrically connected to said first switch and said lower power supply, a collector thereof electrically connected to said higher power supply and used to generate an output signal, and an emitter thereof electrically grounded.

* * * * *